United States Patent
Gandham et al.

(10) Patent No.: US 8,170,562 B2
(45) Date of Patent: May 1, 2012

(54) SYSTEM AND METHOD FOR BASE STATION ASSISTED MOBILITY DETECTION FOR MOBILE HANDSETS

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 422 days.

(21) Appl. No.: 12/590,931

(22) Filed: Nov. 17, 2009

(65) Prior Publication Data

US 2010/0135247 A1 Jun. 3, 2010

Related U.S. Application Data

(60) Provisional application No. 61/200,049, filed on Nov. 24, 2008.

(51) Int. Cl.
*H04W 36/00* (2009.01)
*H04W 4/00* (2009.01)
*H04J 3/00* (2006.01)

(52) U.S. Cl. ......... 455/438; 370/331; 370/329; 370/336

(58) Field of Classification Search .................. 455/438, 455/436; 370/331, 336, 329
See application file for complete search history.

(56) References Cited

U.S. PATENT DOCUMENTS

| | | | |
|---|---|---|---|
| 7,492,736 B2 * | 2/2009 | Ho | 370/329 |
| 2008/0112370 A1 * | 5/2008 | Kwon | 370/336 |

* cited by examiner

*Primary Examiner* — Lester Kincaid
*Assistant Examiner* — Kuo Woo
(74) *Attorney, Agent, or Firm* — Dennis L. Cook, Esq.

(57) ABSTRACT

In this disclosure a technique of base station assisted mobility detection of handsets is described. More specifically by transmitting the subnet ID in the Beacon, a base station simplifies the process of network detection. This also leads to a significant reduction in handoff latency by giving the handset ample time to prepare for the impending handoff.

1 Claim, 2 Drawing Sheets

Layers in a Protocol Stack

Layers in a Protocol Stack

SYSTEM AND METHOD FOR BASE STATION ASSISTED MOBILITY DETECTION FOR MOBILE HANDSETS

CROSS-REFERENCE TO RELATED APPLICATION

The present application claims the benefit of previously filed Provisional Patent Application, Ser. No. 61/200,049.

FIELD OF THE INVENTION

This invention addresses the need to transport high bit-rate data and voice to multiple users over wired and wireless means. In wireless networks where multiple base stations are deployed, handsets may handoff from one base station to the other while in a voice call. In this disclosure a technique of base station assisted mobility detection of handsets is described. More specifically by transmitting the subnet ID in the Beacon, a base station simplifies the process of network detection. This also leads to significant reduction in handoff latency by giving the handset ample time to prepare for the impending handoff.

BACKGROUND OF THE INVENTION

The invention disclosed in this application uses any type modulation and more particularly works with a method of modulation now known by its commercial designation, xMax. This new wireless physical layer technology developed by xG Technology Inc., referred to as xMAX, enables low power transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this efficient way to use a base station to simplify the process of network detection by transmitting the subnet ID in the Beacon is disclosed in the preferred embodiment as being used in these types of integer cycle and pulse modulation systems it can be implemented on any of the broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos.: 12/069, 057; 12/070,0817; 12/380,698; 12/384,546; 12/386,648; 12,387,811; 12/387,807; 12/456,758; 12/456,725; 12/460, 497; 12/583,644; 61/192,799; 61/198,782; and, 61/199,478 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of an efficient way to use a base station to simplify the process of network detection by transmitting the subnet ID in the Beacon as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

In mobile SIP systems a SIP capable handset might move from one IP subnet to another. As a result the IP address of the handset changes. To support seamless mobility there are several solutions, for example; Mobile-IP based, and RE-INVITE based. This disclosure describes a solution that is based on the SIP RE-INVITE message. The basic idea behind this approach is that whenever a handset moves into a new IP subnet it updates the other end of the SIP session with its new IP address using a RE-INVITE message. Mobility across IP subnets can be detected by comparing the subnet IDs of the IP addresses. However, such a mechanism results in high handoff latency. A mechanism for base station (BTS) assisted layer-2 mobility detection that enables faster handoffs is explained in this disclosure.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

In mobile SIP systems a mobile device might move across multiple IP subnets. Whenever a handset moves from one subnet to another it needs to acquire a new IP address. The IP address change is communicated to the other end of the SIP session by sending a SIP RE-INVITE. Early detection of movement into a new subnet can be exploited in reducing the latency involved in handoffs. In this invention, a method for early detection of mobility when a device employing mobile SIP moves from one IP subnet to another is disclosed. xMAX is used as the preferred embodiment network to present the method but the method can be adapted to other mobile SIP systems.

In xMAX networks multiple Mobile Switching Centers (MSCs) are required to provide coverage over a geographical area. Each MSC forms an IP subnet and as mobile devices move from one MSC domain to another, the IP address changes. As a result, a network/application layer handoff is required. A critical step in this process is to identify that the mobile device has moved into a new subnet.

Figure 1:
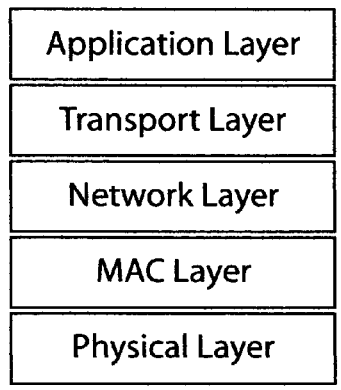
FIG. 1 is a diagram showing layers in a Protocol Stack.
Figure 2:
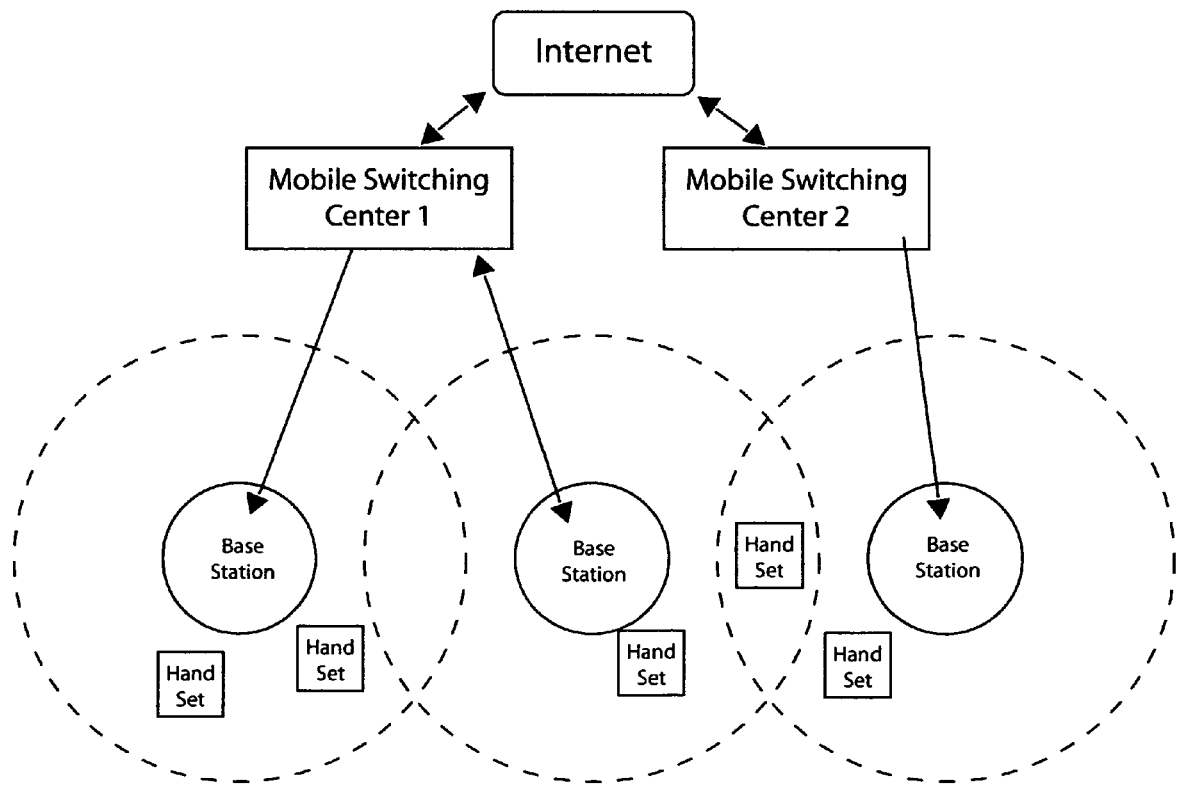
FIG. 2 is a diagram showing an xMAX network structure.

A typical xMAX network architecture consists of multiple MSCs covering a given territory. Each MSC spans an independent IP subnet and controls multiple base stations. A base station is a Layer 2 device and provides wireless connectivity to mobile devices. Various layers of a protocol stack are show in FIG. 1. The hierarchy of an xMAX network is depicted in FIG. 2.

As long as a handset remains within the domain of one MSC, it does not need to change its network layer parameters during a handoff from one base station to another. In other words, only a layer 2 handoff is required when the handset moves between two base stations connected to the same MSC. However, when the handset moves from one MSC to another, Layers 3 and above get involved. This is because the MSC is the link to the outside world and is responsible for correctly routing SIP and RTP traffic to other networks. Thus, a change in IP parameters cannot be avoided during an Inter-MSC handoff. For detailed information on Inter-MSC handoff in xMAX, refer to U.S. patent application Ser. No. 12/387,807 "Provisional Hand-Off Mechanism In A Heterogeneous Mac Protocol For Wireless Networks" discussed above.

Inter-MSC handoffs require significantly more signaling as compared to Layer-2 handoffs and thus entails much greater latency. It is imperative to reduce this latency so that the quality of the voice session is not affected during the handoff. The following sections discuss the basic steps involved in Inter-MSC handoffs. The importance of early MSC detection, and the role played by the BTS, is also discussed.

To understand the importance of MSC detection and its effect on handoff latency, one must first briefly look at the process of Inter-MSC handoff. The various steps involved in this process are:
1. Detection of a new MSC—the process by which the handset detects the presence of a new MSC.
2. Provisional timeslot acquisition—the handset requests provisional timeslots from the new BTS if a handoff seems likely.
3. IP address acquisition—since it is now entering a new domain, the handset requests a new IP address.
4. SIP messaging—once IP information is obtained the Application layer on the handset starts the SIP signaling process.
5. Traffic switch—finally, all incoming traffic is routed to the handset via the new MSC.

The first step in the above listed process is to detect that the handset has moved into a new MSC. This task can be accomplished at various layers of the network protocol stack. For example, one can compare the subnet ID part of the IP address to detect that the handset has moved into a new MSC. However, the handset has to wait until it learns about the subnet ID. The latency associated with such an approach is very high and does not enable one to develop a seamless handoff solution.

In addition, there is a non-zero probability that two subnets might be using the same subnet ID. Note that the preferred embodiment is using private IP addresses in each MSC and if two neighboring MSCs are deployed by different dealers then there is no way to ensure that they do not use the same subnet ID.

If the mobility detection can be accomplished early enough in the handoff process, many steps can be completed before the connection with the old base station breaks, leading to a reduction in overall latency. Thus this disclosure describes a solution wherein the base stations transmit a unique ID that enables the handsets to identify whenever they move into a new MSC domain.

Figure 3:
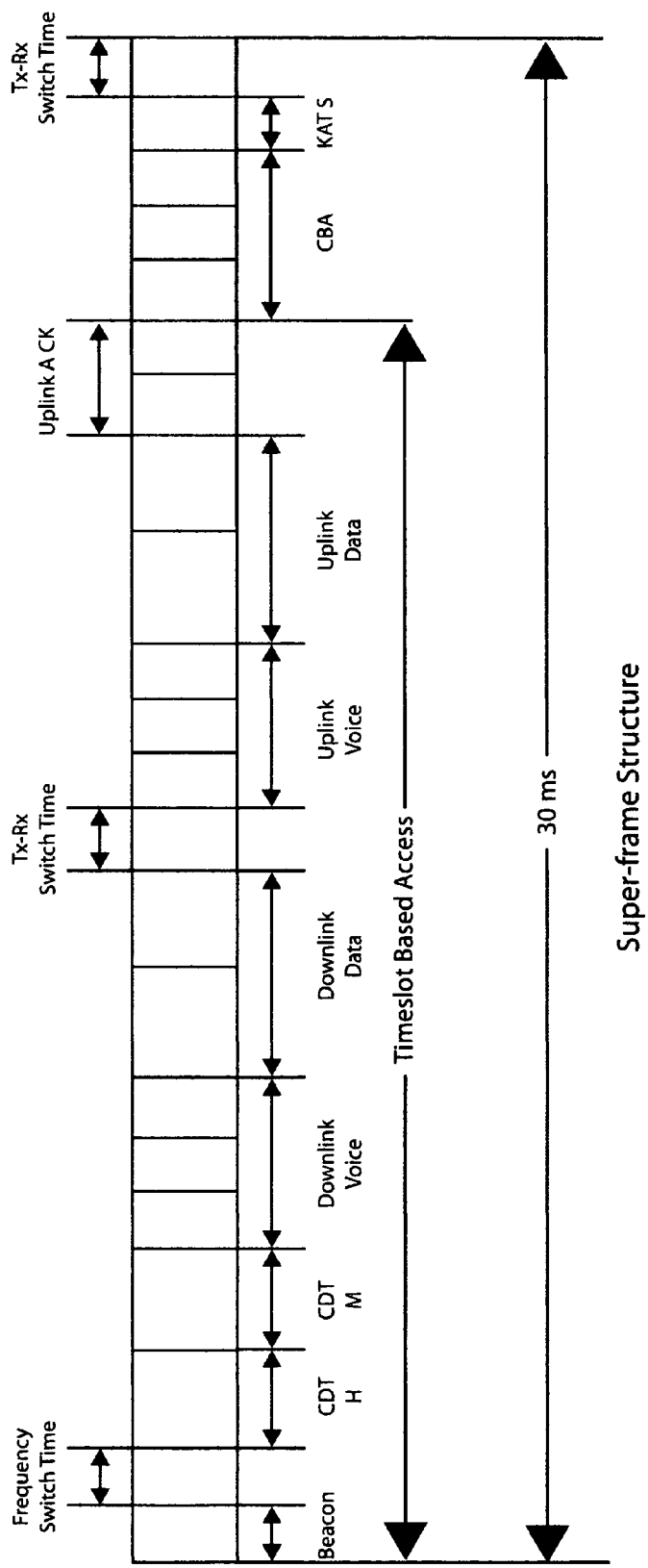
FIG. 3 is a diagram showing a Super-frame structure; and,
FIG. 4 is a diagram showing the structure of a base station ID.

During a voice session, a handset proactively scans all available channels at periodic intervals. During the scan, it tries to receive Beacons that are transmitted by the base stations on all channels. FIG. 3 shows the Media Access Control (MAC) frame structure and the relative location of the beacon transmitted by the base station. At the start of every superframe the base station transmits a beacon on all the channels. The Beacon is useful for maintaining timing synchronization between the base station and the mobile devices. For a detailed description of the beacon and super-frame structure, please refer to U.S. patent application Ser. No. 12/460,497 "Method and Apparatus for Extending a Heterogeneous MAC Protocol to Multi-Channel Systems" discussed above.

Figure 4:
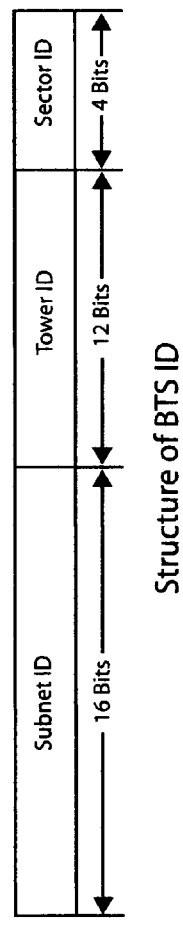

A 32-bit base station ID is included in the beacon such that it allows the handsets to identify the subnet, the base station, and the sector to which it is associated. The structure of the BTS ID is designed as shown in FIG. 4.

The first 16-bits of the base station ID represent the subnet ID that is assigned for each MSC. All base stations connected to that MSC have the same subnet ID in their respective beacons. During scans, the MAC layer on the handset processes the received beacon. On detecting a BTS ID different from that of the current base station, the MAC layer checks if the subnet ID has changed. A change in subnet ID indicates that another MSC is nearby and there may be a possibility of Inter-MSC handoff.

Thus, by broadcasting the subnet ID in the beacon, the base station assists in early detection of new MSCs. Since the detection takes place at the MAC layer on the handset, it can quickly initiate further steps in the handoff process while maintaining the current voice session with the old MSC.

Thus a technique of base station assisted mobility detection of handsets is described. By transmitting the subnet ID in the Beacon, a base station simplifies the process of network detection. It also leads to a significant reduction in handoff latency by giving the handset ample time to prepare for the impending handoff.

Since certain changes may be made in the above described system and method for base station assisted mobility detection without departing from the scope of the invention herein involved, it is intended that all matter contained in the description thereof or shown in the accompanying figures shall be interpreted as illustrative and not in a limiting sense.

What is claimed is:

1. A system for base station assisted channel selection used for mobile node handset scanning and handoff between multiple base stations having each having multiple channels and a medium access control protocol for forwarding Internet Protocol packets between multiple base stations and mobile nodes in voice over the Internet protocol systems on a wireless network comprising:
   multiple switching centers in electrical communication with the internet;
   multiple base stations in electrical communication with said multiple switching centers;
   multiple IP subnets made up of one or more of said multiple base stations that are in electrical communication with one of said multiple switching centers wherein each of said multiple IP subnets has a separate subnet ID;
   one or more mobile nodes in wireless electrical communication with one of said multiple base stations;
   said multiple base stations and said one or more mobile nodes each having a medium access control protocol containing superframes;
   each of said multiple base stations transmitting a beacon signal at the start of each said superframe on each of said multiple base stations' multiple channels;
   said beacon signal containing received signal strength indicators and a base station identifier that includes said subnet ID;
   said medium access control protocol having superframes containing headers that contain provisional time slots dedicated to handing off a mobile node between a current base station a mobile node is in wireless electrical communication with and a replacement base station;
   wherein when said mobile node detects a threshold minimum signal strength from said current base station said mobile node scans for received signal strength indicators from said beacons of other said multiple base stations in mobile nodes' electrical communication range and said mobile node stores said received signal strength indicators of said multiple base stations;

wherein when said mobile node detects an additional threshold minimum signal strength from said current base station it sends a provisional handoff request to a replacement base station that has the strongest stored received signal strength indicator;

wherein said replacement base station receiving said provisional handoff request assigns provisional time slots to said mobile node that sent said provisional handoff request to said replacement base station;

wherein said mobile node uses the subnet ID contained in said beacon sent by said replacement base station to determine that a change in IP subnet will be required when a hand-off is made from said current base station to said replacement base station; and, wherein when said mobile node detects a final threshold minimum signal strength from said current base station said mobile node already has said subnet ID before said mobile node sends a handoff confirm message using said provisional time slots to said replacement base station beginning wireless electrical communication with said replacement base station and also sends a connection break-off message to said current base station breaking off wireless electrical communications with said current base station.

* * * * *